(12) United States Patent
Good

(10) Patent No.: US 10,807,129 B2
(45) Date of Patent: Oct. 20, 2020

(54) CONDUIT CLEANING ARTICLE

(71) Applicant: Brian Good, Trumbull, CT (US)

(72) Inventor: Brian Good, Trumbull, CT (US)

(*) Notice: Subject to any disclaimer, the term of this patent is extended or adjusted under 35 U.S.C. 154(b) by 0 days.

(21) Appl. No.: 15/169,820

(22) Filed: Jun. 1, 2016

(65) Prior Publication Data

US 2016/0346814 A1    Dec. 1, 2016

Related U.S. Application Data

(60) Provisional application No. 62/169,104, filed on Jun. 1, 2015.

(51) Int. Cl.
| | |
|---|---|
| *B08B 9/053* | (2006.01) |
| *B08B 9/055* | (2006.01) |
| *F16L 55/38* | (2006.01) |
| *F16L 55/40* | (2006.01) |
| *F28G 1/00* | (2006.01) |
| *F41A 29/02* | (2006.01) |
| *F16L 101/12* | (2006.01) |

(52) U.S. Cl.
CPC ............ *B08B 9/0551* (2013.01); *B08B 9/053* (2013.01); *B08B 9/055* (2013.01); *B08B 9/0553* (2013.01); *B08B 9/0557* (2013.01); *F16L 55/38* (2013.01); *F16L 55/40* (2013.01); *F28G 1/00* (2013.01); *F41A 29/02* (2013.01); *F16L 2101/12* (2013.01)

(58) Field of Classification Search
CPC ........ B08B 9/053; B08B 9/055; B08B 9/0553
See application file for complete search history.

(56) References Cited

U.S. PATENT DOCUMENTS

| | | | | |
|---|---|---|---|---|
| 864,544 | A * | 8/1907 | Kessler ................. | B08B 9/0553 |
| | | | | 122/379 |
| 1,673,890 | A * | 6/1928 | Smith ................... | B08B 9/0553 |
| | | | | 15/104.061 |
| 3,939,519 | A | 2/1976 | Muirhead | |
| 4,069,535 | A * | 1/1978 | Cato ..................... | B08B 9/0553 |
| | | | | 15/104.061 |
| 4,081,875 | A * | 4/1978 | Nishino ................ | B08B 9/0553 |
| | | | | 15/104.061 |
| 4,425,385 | A * | 1/1984 | Coulter ................. | B08B 9/0557 |
| | | | | 427/230 |
| 5,384,929 | A * | 1/1995 | Smith ................... | B08B 9/0553 |
| | | | | 15/104.061 |

(Continued)

FOREIGN PATENT DOCUMENTS

WO    WO 2005/007308 A1 *    1/2005

*Primary Examiner* — Randall Chin
(74) *Attorney, Agent, or Firm* — Steven M. McHugh

(57) ABSTRACT

A conduit cleaning device is provided and includes a center structure having a center structure wall, a center structure top and a center structure bottom, wherein the center structure wall and center structure top define a center structure cavity and a center structure opening communicated with the center structure cavity. Additionally, a plurality of outer structures is provided, wherein the plurality of outer structures are associated with the center structure wall to extend out of and away from an outer surface of the center structure wall, wherein the plurality of outer structures are disposed in an inclined fashion between the center structure bottom and the center structure top and arranged along the outer surface of the center structure wall to form a helical pattern.

8 Claims, 4 Drawing Sheets

(56) References Cited

U.S. PATENT DOCUMENTS

| | | | |
|---|---|---|---|
| 5,457,841 A * | 10/1995 | Minton | B08B 9/0557 |
| | | | 15/104.061 |
| 5,533,224 A * | 7/1996 | Knapp | B08B 9/0553 |
| | | | 15/104.061 |
| D391,705 S | 3/1998 | Good | |
| 2007/0113362 A1 * | 5/2007 | Lino | B08B 9/0553 |
| | | | 15/104.061 |

* cited by examiner

SECTION A

CONDUIT CLEANING ARTICLE

RELATED APPLICATIONS

This application claims priority to and benefit of U.S. Provisional Patent Application Ser. No. 62/169,104, filed Jun. 1, 2015 and entitled "Conduit Cleaning Article," the contents of which are incorporated herein by reference in its entirety.

FIELD OF THE INVENTION

The present invention relates generally to an article for cleaning barrels, pipes, tubes and other conduits and more particularly to an improved article for cleaning barrels, pipes, tubes and other conduits whereby the improved article allows for easier use.

BACKGROUND OF THE INVENTION

There are many types of systems that utilize barrels, pipes/tubes and other conduits to contain/move projectiles and/or fluids. These systems include weapons systems, chillers, condensers, heat exchangers, boilers, etc. and are well known. For example, a chiller is a device that removes heat from a liquid via a vapor-compression or absorption refrigeration cycle. This cooled liquid can then be used to cool air (such as for air conditioning) or other equipment. When used as air conditioning, the cooled, or chilled, liquid it typically circulated to heat exchangers (or subsequently equivalent structures) which facilitates the transfer of heat (sensible and latent) from the air to the chilled liquid. As such, the liquid absorbs the heat and re-circulated back to the chiller to be cooled again. Accordingly, it is essential to the operation of the chiller (and other systems that utilize pipes/tubes) that the circulation of the liquid is unimpeded. This is particularly important for industrial applications, where the chiller is used to control the cooling of products, mechanisms and other factory machinery.

As another example, a gun barrel is a tube, usually made of metal, used on a weapon to guide a projectile partially along a path, when the projectile is fired from the weapon, typically via an explosive propellant. As the projectile travels along the barrel, gun powder residue, dirt and other contaminants remain on the inside surface of the barrel. Each time a projectile is fired from the weapon, more and more gun powder residue, dirt and other contaminants are left behind within the gun barrel. After a while, this powder residue, dirt and other contaminants accumulate onto and adhere to the inside surface of the barrel. If the gun barrel is not cleaned periodically, then the gun powder residue, dirt and other contaminants will build up on the inside surface of the barrel to a point where the path of the projectile will be impeded (similar to, for example, blood flow and plague in an artery). This can cause the weapon to operate in an unreliable manner and even misfire, which may result in damage to the weapon or injury to the operator. Accordingly, it is essential to the operation of the weapon that the path of the projectile is left unimpeded.

One device that was used in the past is described in U.S. Pat. No. 3,939,519 and another device that is currently used to clean barrels, pipes and conduits is a rotatable tube scrubber and is described in U.S. Design Pat. No. D391705, the contents of both of which are incorporated herein by reference in their entireties. The device shown in U.S. Design Pat. No. D391705 includes a cylindrically shaped center structure having a plurality of inclined outer structures partially wrapped (in a helical manner) about the outer surface of the center structure and is propelled through the barrel, pipe or conduit via compressed air and/or water. As the device traverses the length of the barrel, pipe or conduit, the device rotates about its center axis and the outer structure contacts the contaminants that have adhered to the surface of the barrels, pipes/tubes and other conduits. This contact dislodges the contaminants and causes the dislodged contaminants to traverse and exit the length of the barrel, pipe or conduit with the device.

Unfortunately however, because the outer diameter of the device and the inner diameter of the barrel, pipe/tube and other conduit are very similar, it is difficult to insert the devices into the barrel, pipe/tube and other conduit. This is undesirable because it increases the amount of time it takes to load the devices into the barrel, pipe/tube and other conduit. Additionally, because dislodged contaminants may remain a larger size, there is a risk that the contaminants may scratch or gouge the inner surface of the barrel, pipe/tube and other conduit. This is undesirable because permanent scratches or gouges within the barrel, pipe/tube and other conduit may have a deleterious effect on the flow of the projectile and/or fluid through the barrel, pipe/tube and other conduit.

SUMMARY OF THE INVENTION

A conduit cleaning device is provided and includes a center structure having a center structure wall, a center structure top and a center structure bottom, wherein the center structure wall and center structure top define a center structure cavity and a center structure opening communicated with the center structure cavity. Additionally, a plurality of outer structures is provided, wherein the plurality of outer structures are associated with the center structure wall to extend out of and away from an outer surface of the center structure wall, wherein the plurality of outer structures are disposed in an inclined fashion between the center structure bottom and the center structure top and arranged along the outer surface of the center structure wall to form a helical pattern.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike.

DETAILED DESCRIPTION OF THE INVENTION

Figure 1:
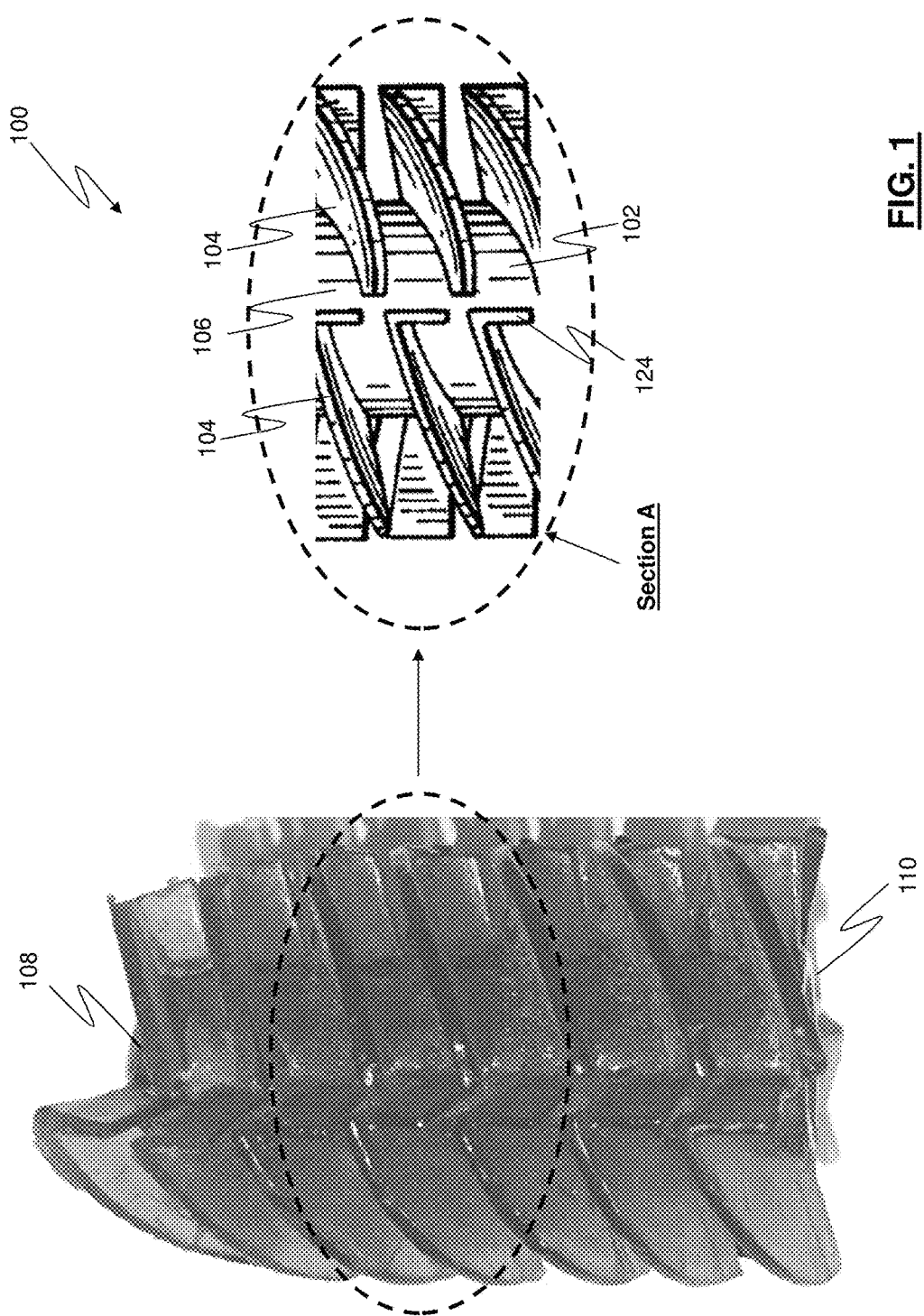
FIG. 1 is a side view of a conduit cleaning article in accordance with one embodiment of the present invention.
Figure 2:
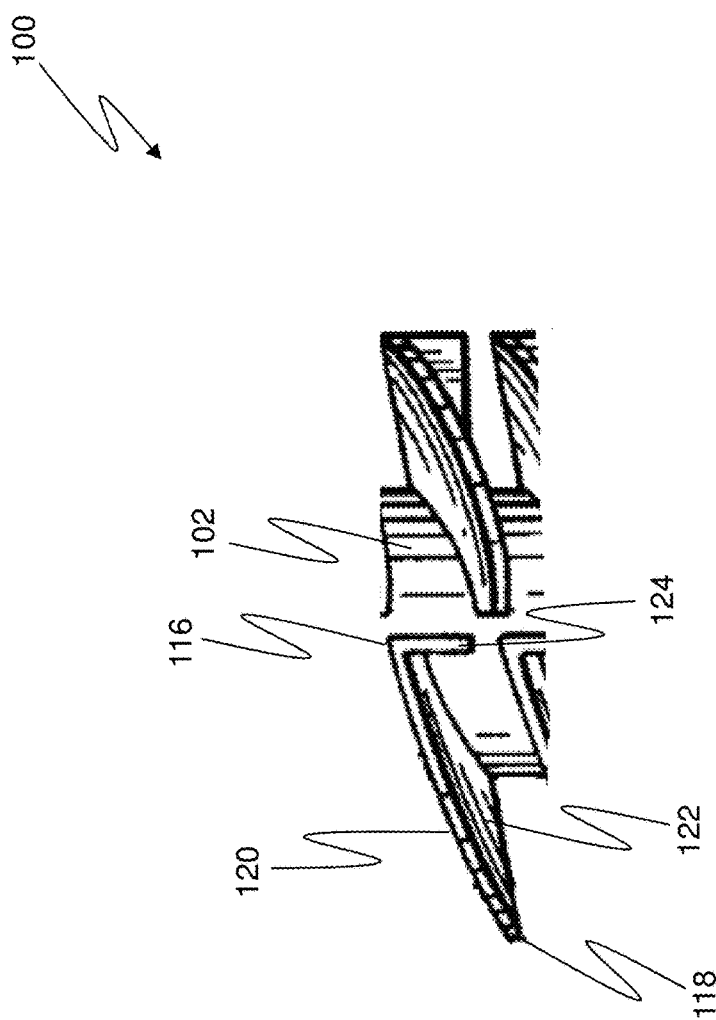
FIG. 2 is a sectional side view of the conduit cleaning article of FIG. 1.
Figure 3:
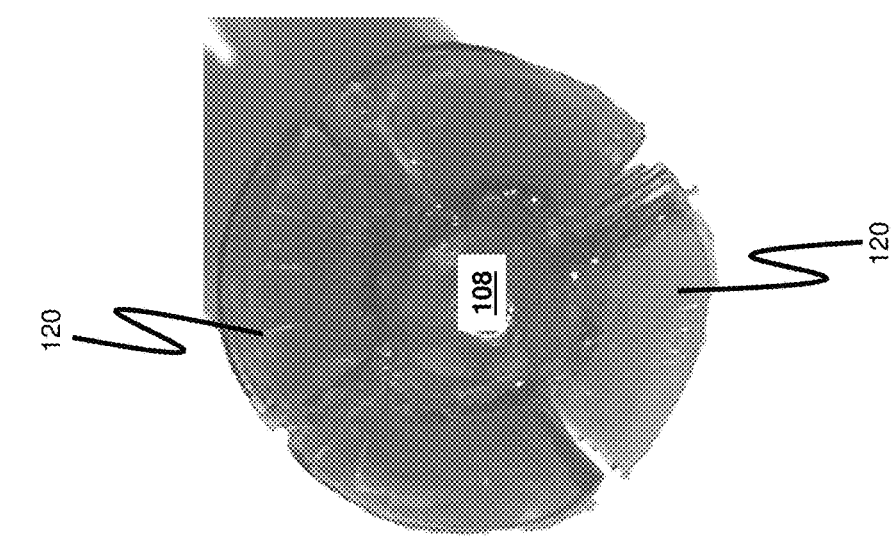
FIG. 3 is a bottom up view of the conduit cleaning article of FIG. 1, in accordance with one embodiment of the invention.
Figure 4:
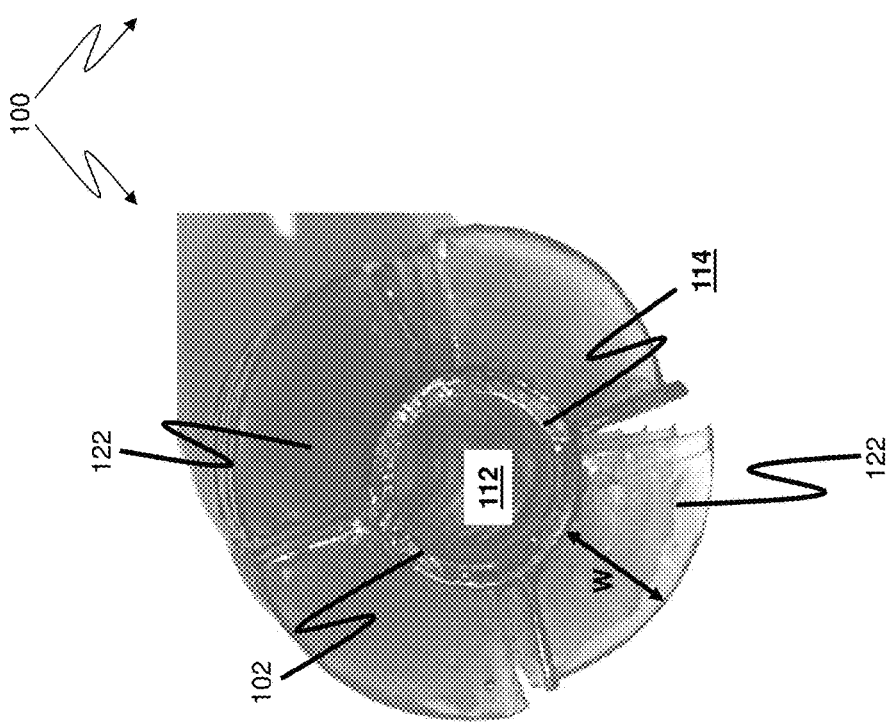
FIG. 4 is a bottom up view of the conduit cleaning article of FIG. 1, in accordance with one embodiment of the invention.
Figure 5:
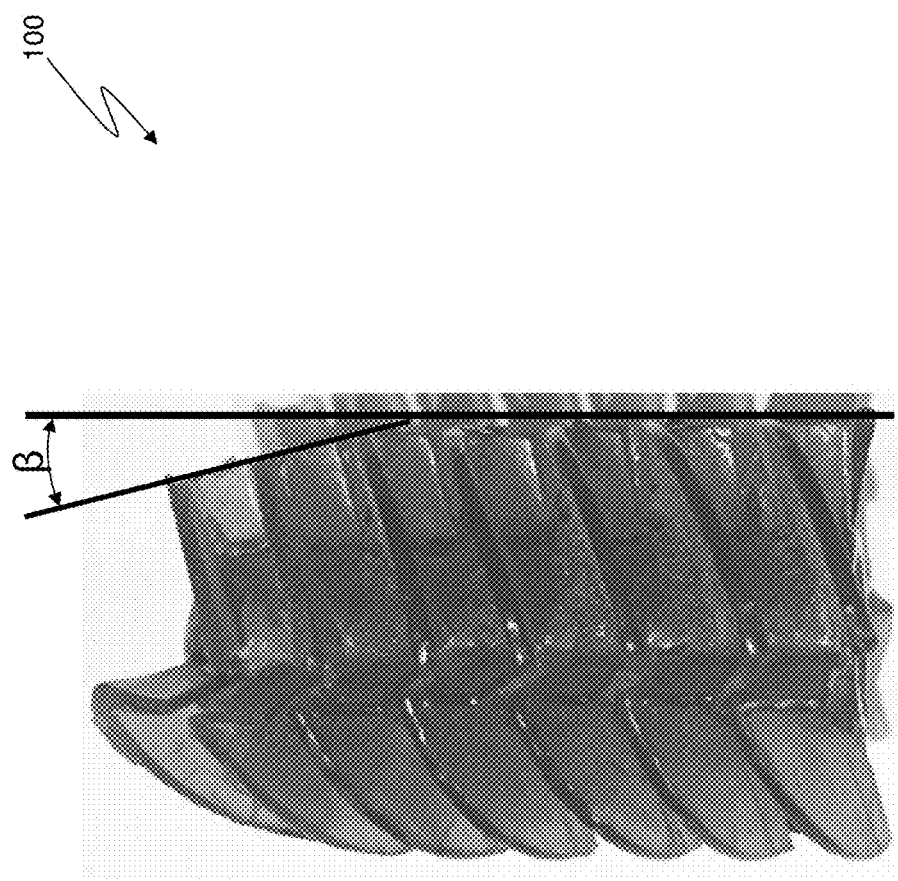
FIG. 5 is a side view of the conduit cleaning article of FIG. 1 illustrating the tape, in accordance with one embodiment of the invention.

Referring to FIG. 1, FIG. 2, FIG. 3, FIG. 4 and FIG. 5, a conduit cleaning article 100 is provided in accordance with one embodiment of the present invention and includes a center structure 102 and a plurality of outer structures 104. The center structure 102 includes a center structure outer surface 106, a center structure top 108 and a center structure bottom 110 and may be cylindrical in shape. The center structure 102 defines an inner cavity 112 and a center structure opening 114 located proximate the center structure bottom 110 to be communicated with the inner cavity 112. The plurality of outer structures 104 are associated with center structure 102 to extend out of and away from the center structure outer surface 106 of the center structure 102. The plurality of outer structures 104 are arranged in an inclined fashion to form a helical shape along the center structure outer surface 106 of the center structure 102. Each of the plurality of outer structures 104 includes an outer structure width W, an outer structure front 116, an outer structure rear 118, an outer structure top surface 120, an outer structure bottom surface 122 and an interface surface 124. The interface surface 124 is located proximate the outer structure front 116 and is arranged to extend out of and away from the outer structure bottom surface 122. It is contemplated that in another embodiment, the interface surface 124 may be arranged to extend out of and away from the outer structure top surface 120.

In accordance with one embodiment of the invention, the outer structure width W of the plurality of outer structures 104 located proximate the center structure bottom 110 have a width W that is larger than the width W of the plurality of outer structures 104 located proximate the center structure top 108. This allows the conduit cleaning article 100 to have a taper angle of $\beta$, where $\beta$ is preferably about 10°, but may be any taper angle between about 1° and about 30°. It should be appreciate this taper allows for the conduit cleaning article 100 to be inserted, or 'loaded,' into the conduit more easily, thereby decreasing the cleaning time and reducing the risk of breakage. Moreover, the conduit cleaning article 100 may be constructed from, or coated with, an abrasive material to help grind down and reduce the contaminants to a smaller size as it traverses the conduit. It should be appreciated that the conduit cleaning article 100 may be constructed from (partially or wholly) or coated with any abrasive material suitable to the desired end purpose, such as silicon carbide having a sufficient grit suitable to the desired end purpose. For example, depending on the application, the grit size may range from 20 grit (841 microns) to 600 grit (20 microns).

It should be appreciated that a method for implementing the conduit cleaning article 100 includes inserting the conduit cleaning article 100 into a barrel, pipe, tube or other conduit such that the center structure top 108 is first into the opening of the barrel, pipe, tube or other conduit and such that the center structure bottom 110 is substantially flush with the opening to the barrel, pipe, tube or other conduit. A stream of air and/or water is forced into the opening of the barrel, pipe, tube or other conduit such that the air and/or water contacts the center structure bottom 110. As the stream of air and/or water flows contacts the conduit cleaning article 100, the stream of air and/or water flows into the inner cavity 112 and contacts the outer structure bottom surface 122 to become incident on the interface surface 124. The force of the stream of air and/or water causes the conduit cleaning article 100 to rotate and traverse the length of the barrel, pipe, tube or other conduit. For example, the vertical support causes the conduit cleaning article 100 to spin when the air and/or water hits it. Additionally, pitched blade (i.e. outer structures 104) creates spinning and cutting action on the debris on the tube wall. As the conduit cleaning article contacts the contaminants on the inner surface of the barrel, pipe, tube or other conduit, the contaminants become dislodged and flow along with the conduit cleaning article 100. Additionally, as the dislodged contaminants interact with the conduit cleaning article 100, the dislodged contaminants are reduced in size due to the abrasive material.

It should be appreciated that the elements of the conduit cleaning article 100 may be constructed, wholly or partially, from any material or combination of materials suitable to the desired end purpose, such as silicon carbide, metal, plastic, rubber, composite or any combination of thereof.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A conduit cleaning device, comprising,
   a center structure having a center structure wall, a center structure top and a center structure bottom, wherein the center structure wall and center structure top define a center structure cavity and a center structure opening communicated with the center structure cavity;
   a plurality of outer structures, wherein the plurality of outer structures are associated with the center structure wall to extend out of and away from an outer surface of the center structure wall and wherein each of the plurality of outer structures include an outer structure width, W, wherein the outer structure width, W, of the outer structures located proximate the center structure bottom is larger than the outer structure width, W, of the outer structures located proximate the center structure top such that the conduit cleaning device includes a taper angle $\beta$ of between about 1° and 30°,
   wherein the plurality of outer structures are disposed in an inclined fashion between the center structure bottom and the center structure top and arranged along the outer surface of the center structure wall to form a helical pattern.

2. The conduit cleaning device of claim 1, wherein each of the plurality of outer structures include an outer structure front and outer structure rear.

3. The conduit cleaning device of claim 2, wherein each of the plurality of outer structures includes an interface surface located proximate to the outer structure front, wherein the interface surface extends downward from the outer structure front.

4. The conduit cleaning device of claim 1, wherein the taper angle $\beta$ is about 10°.

5. The conduit cleaning device of claim 1, wherein the center structure opening is located proximate the center structure bottom.

6. The conduit cleaning device of claim 1, wherein at least a portion of the conduit cleaning device is configured to have an outer surface that includes an abrasive material.

7. The conduit cleaning device of claim 1, wherein at least a portion of the conduit cleaning device is at least one of,
coated with an abrasive material, or
constructed from an abrasive material.

8. The conduit cleaning device of claim 7, wherein the abrasive material is a silicon carbide material having a grit size ranging from about 20 grit (841 microns) to about 600 grit (20 microns).

* * * * *